July 13, 1965  H. H. DRONBERGER  3,194,903
MOTOR-DRIVEN CAM-ACTUATED TIMED ELECTRICAL MULTI-SWITCH
Filed March 5, 1963  2 Sheets-Sheet 1

WITNESSES
Theodore F. Wrobel
Leon M. Garman

INVENTOR
Hal H. Dronberger
BY
Frank Cristiano Jr.

United States Patent Office 3,194,903
Patented July 13, 1965

3,194,903
MOTOR-DRIVEN CAM-ACTUATED TIMED
ELECTRICAL MULTISWITCH
Hal H. Dronberger, Columbus, Ohio, assignor to Westinghouse Electric Corporation, Pittsburgh, Pa., a corporation of Pennsylvania
Filed Mar. 5, 1963, Ser. No. 262,956
3 Claims. (Cl. 200—38)

This invention relates to electric switching mechanisms of the program type for effecting an electrical program or predetermined sequence of electric circuit controlling operations, and has for an object to provide an improved mechanism of this type.

Mechanisms of the above type, also known as program timer switches, are generally well-known and are employed for automatically controlling, in accordance with a predetermined program, the sequence and/or duration of a series of operations in automatic clothes washing machines, dishwashing machines and the like.

One of the main objects of this invention is to provide a program timer switch for selectively controlling at least two electrical programs in a simple, yet effective, manner.

Another object is to provide a program timer switch for selectively controlling at least two electrical programs, that is simple in construction and readily shiftable from one program to another program by the operator.

A further object is to provide a plural program timer switch that is shiftable only when in the "off" position to selectively control one of a plurality of programs.

Briefly, in accordance with the invention, there is provided a rotary program timer switch for selectively controlling at least a first predetermined electrical program and a second predetermined electrical program, which switch comprises a rotary, motor driven shaft having dual cam structure including a first rotary cam member and a second rotary cam member mounted thereon and jointly rotatable thereby. A set of electrical contacts, actuable by a cam follower into and out of engagement with each other to effect energization of an electrical device such as a pump, heater, or the like, is further provided. The shaft is manually translatable in axial direction from a first position, in which the first cam is disposed in operative relation with the cam follower to control actuation of the contacts in accordance with the first program, to a second position, in which the second cam is disposed in operative relation with the cam follower to control actuation of the contacts in accordance with the second program.

A further feature of the invention resides in provision of means for permitting axial translation of the shaft from one to another of the two positions only when the shaft is in the "off" position, thereby preventing the possibility of accidentally shifting programs at any intermediate point in the programs.

The foregoing and other objects are effected by the invention as will be apparent from the following description and claims taken in connection with the accompanying drawings, forming a part of this application, in which:

Figures 1, 2, 3, 4:
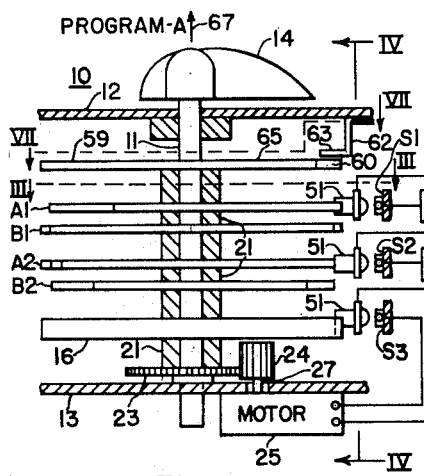
FIGURE 1 is a central sectional view of a program timer switch for selectively controlling two electrical programs and formed in accordance with the invention.
FIG. 2 is a sectional view similar to that shown in FIG. 1 but with the switch shown in another position.
FIG. 3 is a transverse sectional view taken on line III—III of FIG. 1.
FIG. 4 is a sectional view taken on line IV—IV of FIG. 1.

Referring to the drawings in detail, especially FIGS. 1, 2 and 4, there is shown a dual program switch mechanism, generally designated 10, having a shaft 11 mounted for rotation within a pair of spaced mounting plates 12 and 13 and having a manipulating knob 14 affixed to one end thereof. In the illustrations, the mechanism is in the "off" position. The shaft 11 is provided with a stack of cams 16, A1, B1, A2 and B2 maintained in axially spaced relation with each other by a plurality of spacer members 21 and jointly rotatable by the shaft. The cams A1 and A2 are employed to control one program, while the cams B1 and B2 are employed to control another program. At the end of the shaft opposite to the manipulating knob 14, there is provided a gear 23 disposed in meshing relation with a pinion 24 driven by an electric motor 25 of any suitable constant speed type. For example, the motor 25 may be of the well-known self-starting type, used in timers, having a low r.p.m. output shaft 27 to which the pinion 24 is attached.

Figure 8:
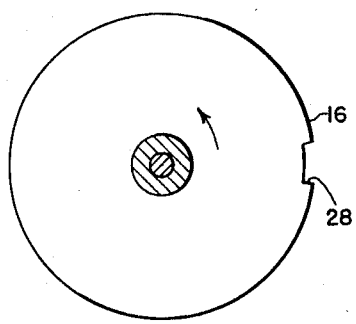
FIG. 8 is a plan view of the motor cam.

The cam 16 is employed to control energization of the motor 25. Hence, it may be referred to as a motor cam and, as shown in FIG. 8, it is of circular contour with a notch 28 formed therein.

Figure 5:
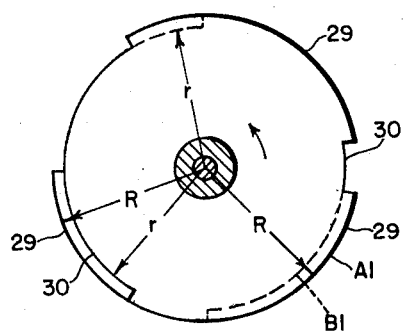
FIG. 5 is a plan view of the first dual cam structure.
Figure 6:
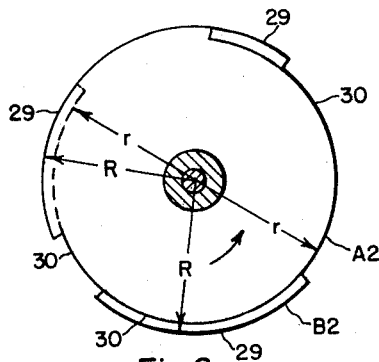
FIG. 6 is a plan view of the second dual cam structure.

The cams A1 and B1 will hereafter be referred to as first dual cam structure, while the cams A2 and B2 will hereafter be referred to as second dual cam structure. Referring more particularly to FIGS. 5 and 6, it will be seen that the first and second dual cam structures A1, B1 and A2, B2 are of generally similar circular configuration and are provided with arcuate peripheral portions 29 of large radial extent R and arcuate peripheral portions 30 of small radial extent $r$. The peripheral surfaces of large radial extent R serve as the "throw" portions for the two dual cam structures, while the surfaces of small radial extent $r$ serve as inactive portions, as well known in the art.

The exact angular extents of the large radial surfaces and the angular extents of the smaller radial surfaces of the cams A1, B1 and A2, B2 may be modified in any desirable manner to suit the intended application and, in the illustrations, these surfaces have been arbitrarily chosen to show the invention.

The dual program switch may be further provided with a pair of side walls 46 and 47 (see FIG. 3) formed of any suitable insulating material, and serving to support a plurality of switches S1, S2 and S3 (see FIGS. 1 and 2). The switches may all be substantially identical. Accordingly, only one switch (S1) has been shown in plan view, it being understood that the others may be substantially identically formed. The switch S1, as best shown in FIG. 3, includes a stationary contact 48 attached to side wall 46 and cooperatively associated with a movable contact 49 mounted on a flexible spring arm 50 attached to sidewall 47. The arm 50 has a cam follower or finger 51 formed therein and struck from the plane of the arm 50. The switch S1, as illustrated, is of the normally open type, that is, in the relaxed position as illustrated in FIGS. 1 to 3, the contacts 48 and 49 are in circuit interrupting position. The switch S1 is further provided with a pair of lugs 52 and 53 for connection in a manner to control energization of a suitable electric device 55 such as a water pump, electric heater, or the like, by a pair of suitable power supply conductors L1 and L2. Accordingly, when the contacts 48, 49 of the switch S1 are in engaged position, a circuit is completed from conductor L1 through the switch contacts and the electric device 55 to the other conductor L2.

In a similar manner, the switch S2 is employed to connect a second electrical device 56 of any suitable type, as desired, to the power supply conductors L1, L2, and the switch S3 is employed to connect the motor 25 to the conductors L1 and L2.

With the dual program switch in the position shown in FIG. 1, the followers 51 of the switches S1, S2 and S3 are disposed in operative association with the peripheries of the cams A1, A2 and the motor cam 16. When the program switch is in the "off" position, as illustrated, the followers 51 of switches S1 and S2 are disposed in registry with the inactive portions 30 of the cams A1 and A2 and the follower 51 of switch S3 is in registry with the notch 28 in cam 16, so that all of the contacts of the switches S1, S2 and S3 are in the disengaged or circuit interrupting positions.

Figure 7:
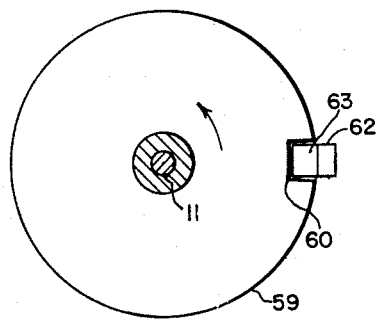
FIG. 7 is a transverse sectional view taken on line VII—VII of FIG. 1.

There is further provided, as illustrated in FIG. 7, a control plate 59, of circular configuration and having a recess 60 formed in its periphery, to prevent shifting from one program to the other program in any except the "off" position. The control plate 59 is firmly connected to the shaft 11 and is disposed in cooperative relation with a control tab 62 having a finger 63 formed therein and adapted to pass through the recess 60 in the control plate. The control tab 62 is attached to the wall member 12; hence it is stationary with respect to the shaft 11. In the position shown in FIG. 1, the finger 63 of the control tab is disposed above the surface 65 of the control plate. Accordingly, the control plate 59 may be rotated by the shaft 11 without interference by the control finger 63.

Figure 9:
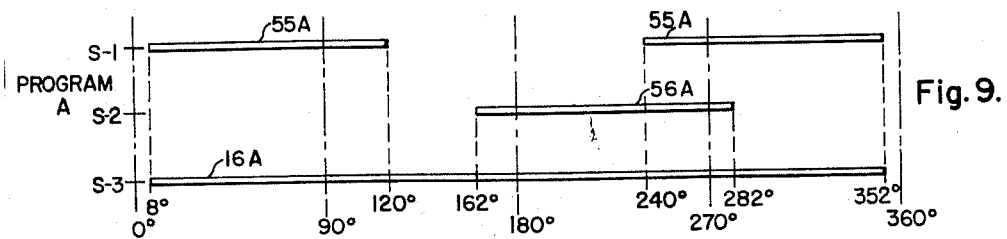
FIG. 9 is a chart showing a representative electrical program attained with the switch in the position shown in FIG. 1.

When the program switch is positioned as illustrated in FIG. 1 it is effective to control a program of events A, as illustrated in the chart shown in FIG. 9. To initiate the program A, the knob 14 is manually rotated in the direction of the arrows shown in FIGS. 3, 5 and 7 a sufficient degree to position the motor cam 16 in a manner to move the follower 51 of switch 53 out of the notch 28 and onto its circumferential surface. During this movement, the cam follower 51 moves the movable contact 49 into contact with the stationary contact 48, thereby initiating the electrical circuit through the motor 25 to initiate rotation of the shaft 11. Since the motor cam 16 has a substantially circular periphery throughout its entire extent with the exception of the recess 28, the motor is energized until the shaft 11 completes substantially one full revolution, as indicated by the continuous bar 16A in FIG. 9. Concurrently therewith, the cams A1 and A2 are rotated and rendered effective to bring their peripheral surfaces of large radial extent R into registry with their associated cam followers 51, moving the latter in a direction to engage the contacts of the switches S1 and S2 in the sequential manner indicated by the bars 55A and 56A, thereby connecting the electrical devices 55 and 56, respectively, to the condutcors L1, L2, and disconnecting the devices in accordance with the shape of the cams. The "on" periods for the electrical device 55 are indicated by the bars 55A, while the "on" period for the electrical device 56 is indicated by the bar 56A. It will be understood, that as the motor cam 16 completes one revolution, its recess 28 will once again move into registry with its associated follower 51, thereby permitting the follower to move into the recess, disengaging the contacts of the switch S3 and interrupting the energization cycle for the motor 25. Accordingly, rotation of the shaft 11 and the cams A1 and A2 is also interrupted at this time and the program A is terminated. At the end of this sequence of operations, the control finger 63 is once again brought into registry with the recess 60 of the control plate 59.

Figure 10:
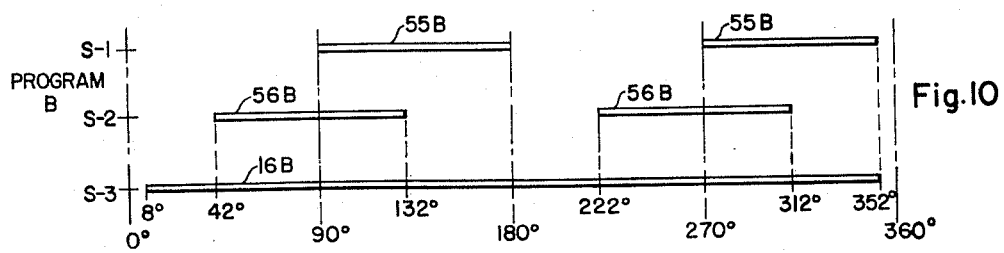
FIG. 10 is a chart showing a representative program attained with the switch in the position shown in FIG. 2.

To condition the switch for a second program B, as illustrated in FIG. 10, the knob 14 is grasped by the operator and the shaft 11 translated axially in the direction indicated by the arrow 67 in FIG. 1, to move the cams and the control plate to another position, shown in FIG. 2, with respect to the followers 51 of the switches S3, S2 and S1 and the control finger 63, respectively. Such axial movement of the shaft 11 is permitted by finger 63 and limited to a predetermined amount by a spacer 68 encompassing the shaft 11 and attached to the wall plate 12. With the switch shaft 11 so positioned, the control plate 59 is positioned above the plane of the control finger 63, the cams A1 and A2 are positionad out of operative association with the followers 51 of the switches S1 and S2, respectively, the cams B1 and B2 are positioned in operative association with the followers 51 of switches S1 and S2, respectively, and the motor cam 16 is re-positioned but still maintained in operative association with the follower 51 of the switch S3. It will also be noted that the motor pinion 24 is still maintained in meshing relation with the shaft gear 23.

To initiate the second program B, the shaft 14 is manually rotated, in the same direction as explained in connection with the first program A, to a sufficient extent to cause the motor cam 16 to move the follower 51 of the switch S3 to the contact engaging position. Accordingly, the motor 25 is energized, as indicated by bar 16B, thus rotating the shaft 11 in the direction of the arrows shown in FIG. 3, for example, and the switches S1 and S2 are actuated by the cams B1 and B2 to energize the electrical devices 55 and 56 in the manner indicated by the bars 55B and 56B, respectively.

In a manner similar to program A, as the motor cam 16 is rotated through substantially one full revolution, its notch 28 will once again be brought into registry with the cam follower 51 of the switch S3, thereby disengaging the contacts 49 and 48 of the switch and interrupting the circuit through the motor 25. Accordingly, interruption of the shaft rotation is also attained at this time and the program is terminated.

By considering FIG. 9 and FIG. 10 and comparing them with each other, it will be seen that the energization and deenergization periods of the electrical devices 55 and 56 are not the same, so that the switch is arranged to provide at least two programs of timed events for the same electrical devices 55 and 56.

To recondition the switch for operation in accordance with the program A, it is only necessary to move the switch shaft 11 in axial direction as indicated by the arrow 68 in FIG. 2 to restore it to the position shown in FIG. 1. The movement of the shaft 11 from the position shown in FIG. 1 to the position shown in FIG. 2, as well as movement of the shaft from the position shown in FIG. 2 to the position shown in FIG. 1 is permitted by the control plate 59 and finger 63 only when the switch knob 14 is in the "off" position, since the control finger 63 is in registry with the recess 60 in the control plate 59 only when the switch is in the "off" position. At all other times the control finger 63 is disposed out of registry with the recess 60, thereby acting as a barrier restraining movement of the shaft 11 in axial direction, although permitting rotation of the control plate 65.

It will now be seen that the invention provides an electric switching mechanism of the program type that is effective to control a plurality of electrical devices in accordance with two different programs, which mechanism is simple in design and rugged in construction with a minimum of moving parts.

Although in the embodiment shown, the cams A1, B1 and A2, B2 have been illustrated as separate cam plates for simplicity, they may be formed as unitary dual cams, if so desired, and contours may be formed to provide the peripheral throw portions of each individual cam. This arrangement is not illustrated, since dual cams per se are well-known in the art. Also, the angular extent of the surfaces of large radial extent R and small radial extent $r$ may be modified to suit the particular application.

It will further be noted that the motor cam 16 is considerably thicker than the individual cams A1, B1, etc. since in this embodiment, the operation of the motor 25 is identical for both programs A and B. However, the motor cam 16 may be formed as two separate cam members, if desired.

While the invention has been shown in one form, it will be obvious to those skilled in the art that it is not so limited, but is susceptible of various other changes and modifications without departing from the spirit thereof.

I claim as my invention:

1. A rotary program timer switch comprising
  first and second sets of electrical contacts,
  means including first and second cam followers for actuating said first and second sets of contacts, respectively,
  first, second and third cam members,
  a rotatable shaft having said cam members mounted thereon and jointly rotatable therewith,
  means for manually translating said shaft from a first position in which said first cam member is operatively associated with said first cam follower to control a first program, to a second position in which said second cam member is operatively associated with said first cam follower to control a second program,
  means including an electric motor for rotating said shaft a predetermined angular extent,
  said second set of contacts being arranged to effect energization and deenergization of said motor, and said third cam member being maintained in operative association with said second cam follower in both of said shaft positions.

2. The structure recited in claim 1 in which
  said third cam member is arranged in a manner to effect disengagement of said second set of contacts upon rotation of the shaft through said angular extent to provide an "off" position in which both of said programs are terminated, and further including means permitting axial translation of the shaft from and to said first position only when said shaft is in said "off" position.

3. The structure recited in claim 1 in which
  the shaft is rotatable to an "off" position by the motor to terminate said programs, and
  further including means defining a slot and finger, one of which is movable with the shaft, disposed in registry with each other in said "off" position to permit axial translation of the shaft from and to the first position, and out of registry with each other when the shaft is in other than said "off" position to restrain said axial translation.

References Cited by the Examiner
UNITED STATES PATENTS

| | | | |
|---|---|---|---|
| 1,445,653 | 2/23 | Watson | 123—90 |
| 2,619,557 | 11/52 | Illian | 200—153 |
| 2,676,235 | 4/54 | Kennedy et al. | 200—153 |
| 3,126,759 | 3/64 | Cook | 200—38 |

BERNARD A. GILHEANY, *Primary Examiner*.